Sept. 7, 1948.  H. J. ARTHUR ET AL  2,448,947
INJECTION MOLDING APPARATUS
Filed April 4, 1945  2 Sheets-Sheet 1
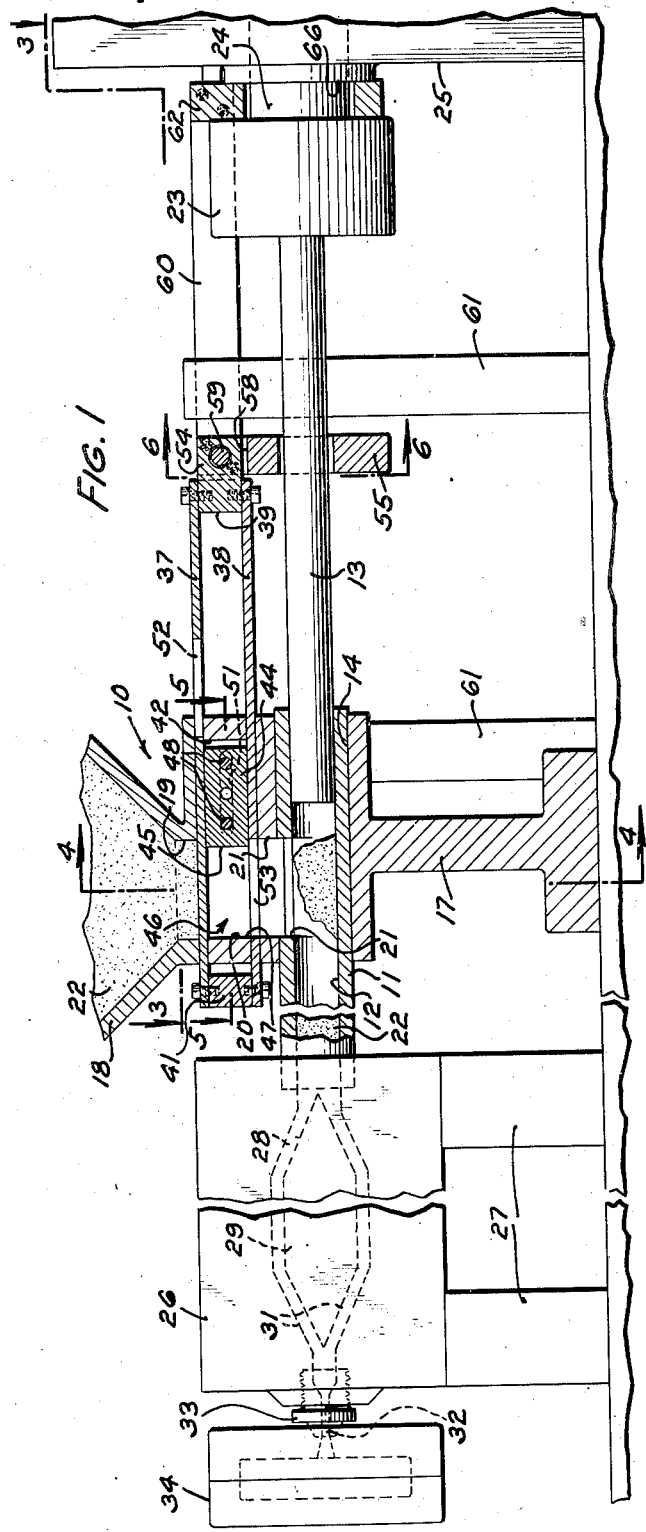
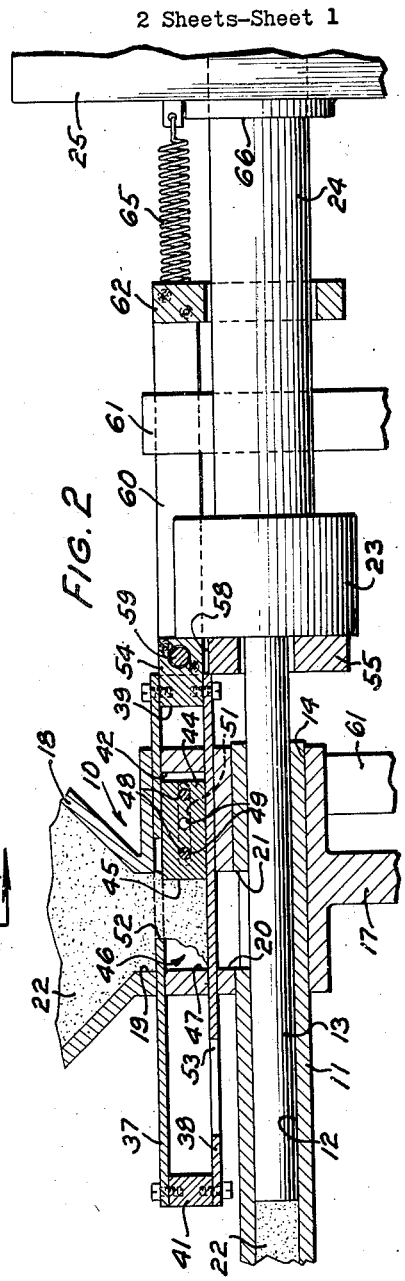
INVENTORS
H. J. ARTHUR
H. S. McCRORY
BY
ATTORNEY

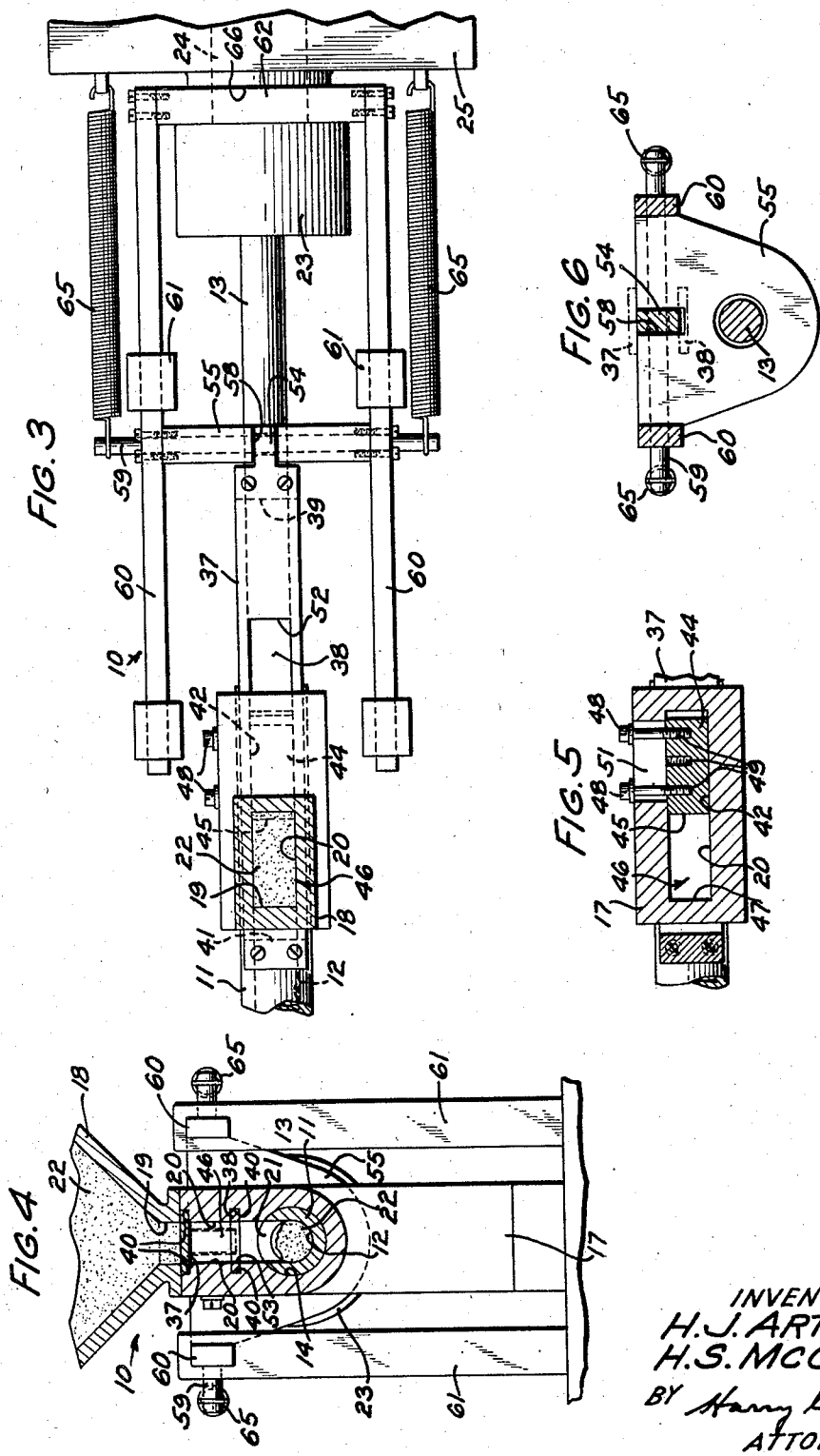

UNITED STATES PATENT OFFICE 2,448,947

INJECTION MOLDING APPARATUS

Harry J. Arthur, Chicago, and Harrell S. McCrory, Berwyn, Ill., assignors to Western Electric Company, Incorporated, New York, N. Y., a corporation of New York Application April 4, 1945, Serial No. 586,462

7 Claims. (Cl. 18—30)

This invention relates to injection molding apparatus and particularly to a metering device for feeding measured charges of molding compound into an injection chamber of such an apparatus.

An object of the invention is to provide a practicable and simple metering device for efficiently and accurately feeding varying measured charges of granular molding compound as needed into an injection chamber of a molding apparatus, such charges varying in accordance with the quantity of compound remaining in the chamber after each cycle of operation of the apparatus.

In accordance with the above object, the present invention, in one embodiment thereof as applied to an injection molding apparatus for producing thermoplastic elements, contemplates a compound feeding and metering device comprising a compound supply hopper having upper and lower slides movable in unison associated with the hopper outlet and having offset openings, a measuring chamber being arranged between the slides for receiving compound from the hopper outlet when the opening in the upper slide is in communication with such outlet, at which time a bottom discharge opening of the measuring chamber, communicating with an injection chamber, is closed by the lower slide. Upon the opening in the lower slide being positioned to open the measuring chamber discharge opening, the measured compound drops vertically into the injection chamber in front of an injection plunger, at which time the upper slide is positioned to cut off the hopper outlet from the measuring chamber. An adjustable wall of the measuring chamber is effective to decrease or increase the normal capacity thereof in accordance with the volume of compound required for the particular element being molded. The slides are operatively connected to the plunger in such a manner that the effective size of the opening in the upper slide communicating with the hopper outlet, and thus the amount of compound delivered to the measuring chamber and onto the lower slide, is determined by the advance travel of the plunger which, in turn, is dependent upon the quantity of compound remaining in the injection chamber after each cycle of operation of the molding apparatus. The arrangement is such that at no time is it possible for the compound to drop onto the injection plunger, but only in front of it.

Other objects and advantages of this invention will more fully appear from the accompanying detailed description taken in conjunction with the accompanying drawings, in which Fig. 1 is a fragmentary central longitudinal vertical section, partly in elevation, and somewhat diagrammatic, of an injection molding apparatus embodying the features of this invention, the injection plunger and compound feeding slides being shown in their extreme retracted positions;

Fig. 2 is a fragmentary view similar to that of Fig. 1, showing the injection plunger and compound feeding slides in advanced positions;

Fig. 3 is an irregular plan section taken on the line 3—3 of Fig. 1;

Fig. 4 is a vertical section taken on the line 4—4 of Fig. 1;

Fig. 5 is a plan section taken on the line 5—5 of Fig. 1; and

Fig. 6 is a vertical section taken on the line 6—6 of Fig. 1.

Referring now to the drawings, one embodiment of the molding compound feeding and metering device, indicated in general at 10, embodying the features of this invention, is shown applied to a thermoplastic injection apparatus, which is illustrated fragmentarily. Such an apparatus comprises an injection cylinder 11, in a cylindrical chamber 12 of which is arranged, for reciprocation, an injection plunger 13. The cylinder 11 is fixed in a bore 14 of a supporting standard 17, upon the upper end surface of which is suitably secured a granular molding compound supply hopper 18 having an outlet opening 19 communicating with the upper end of a passage 20 in the standard 17, the passage 20 communicating at its lower end with an inlet opening 21 in the peripheral wall of the injection cylinder 11, through which opening granular molding compound, indicated at 22 in the hopper 18, enters the chamber 12.

For actuating the injection plunger 13, its right end (Figs. 1, 2 and 3) is connected by means of a suitable coupling 23 to a piston rod 24 carried by a piston (not shown) of a hydraulic cylinder 25, the cylinder being adapted to alternately receive motive fluid at each end whereby the piston rod 24 and the attached injection plunger 13 are alternately advanced and retracted at suitable speeds, the speed of advance being slower than the speed of retraction, which is at a uniform speed. At its left end (Fig. 1), the injection cylinder 11 extends into a suitably controlled heating head 26 carried on standards 27 and adapted to plasticize the molding compound 22 as it is advanced through an annular passage 28 thereof communicating with the injection chamber 12 and surrounding a torpedo shaped member 29, the passage communicating at its left end with a plurality of angularly disposed passages 31, which are in communication with an orifice 32 of an injection nozzle 33 attached to the left end of the heating head 26. Suitably supported in operative relation with the nozzle 33 is a removable die or mold 34, into which the plasticized molding compound 22 is injected during an advance movement of the injection plunger 13.

The compound feeding and metering device 10 embodying the features of this invention is arranged between the hopper 18 and the injection cylinder 11 and comprises parallel upper and lower slides 37 and 38, respectively, connected together at their right ends in spaced relation by a T-shaped block 39 (Figs. 1 and 3). At their right ends, the slides 37 and 38 are guided in slideways 40 formed in opposite walls of the passage 20 in the supporting standard 17 and are connected together by a block 41 (Fig. 2). That portion of the passage 20 in which the slides 37 and 38 operate is extended to the right (Figs. 1 and 5) to provide a chamber 42, in which is fitted for longitudinal movement an adjustable member 44, the left end face of which provides an adjustable wall 45 of a measuring chamber 46 having an opposite wall thereof formed by a surface 47 of the standard 17 and upper and lower walls provided by the lower and upper spaced faces of the slides 37 and 38, respectively, when the slides have been moved to a position intermediate the fully advanced and retracted positions, shown in Figs. 1 and 2, respectively. The member 44 may be adjusted longitudinally in the chamber 42 to various positions for increasing or decreasing the normal capacity of the measuring chamber 46 and retained in such position by one or a plurality of screws 48 (Fig. 5) threaded into apertures 49 in the member, the screws extending through a slot 51 in the standard 17. In practice, the size of the chamber 46 should be such that it can hold a volume of compound equal to the plasticized compound required to mold the particular element being molded. Each of the slides 37 and 38 has an opening 52 and an opening 53, respectively, which are offset, the arrangement being such that when the slides are in their fully retracted position (Fig. 1), the opening 53 in the lower slide 38 opens the bottom of the measuring chamber 46 to the inlet opening 21 of the injection chamber 12 and communication between the hopper outlet opening 19 and the top of the measuring chamber is closed by the upper slide 37. When the slides 37 and 38 are in their fully advanced position (Fig. 2), which position will vary with the quantity of molding compound 22 remaining in the injection chamber 12 after each cycle of operation of the apparatus, which operation will be described hereinafter, the opening 52 in the upper slide 37 will be in communication with the hopper outlet opening 19, thus opening the upper end of the measuring chamber 46 to the entrance thereinto of molding compound 22 from the hopper 18. Thus, the slides 37 and 38 are operable as a unit alternately to place their openings 52 and 53, respectively, in alignment with the inlet 21 of the injection chamber 12. Usually the amount of compound deposited in the chamber 46 is about equal to the amount required to mold an element. However, ahead of the plunger 13, during each advance thereof, is about 20% more compound, either plastic or dry, than is required to mold an element.

The slides 37 and 38 are reciprocated during the advance and retractive movements of the injection plunger 13 in the following manner: An arm 54 of the T-shaped block 39 interconnecting and spacing the slides 37 and 38 is connected to an irregular shaped collar 55 (Fig. 6) freely surrounding the injection plunger 13 and having a slot 58, into which the arm is fitted, and a pin 59 which extends through the collar and arm. Opposite ends of the pin 59 extend through a pair of bars 60 attached to opposite faces of the collar 55, the bars each being slidably fitted in a pair of apertured spaced standards 61. At their right ends, the bars 60 are attached to an irregular shaped collar 62 freely surrounding the piston rod 24. Coiled tension springs 65 attached at their opposite ends to the ends of the pin 59 and to an end face of the hydraulic cylinder 25 serve to normally urge, as a unit, the bars 60 and the attached parts including the slides 37 and 38 to their fully retracted position, as shown in Figs. 1 and 3, and upon the parts reaching such position, the springs have expended their energy or tension and the collar 62 abuts a face 66 of the hydraulic cylinder 25. The plunger 13 is usually retracted at a high speed and the springs 65 tend to start the slides in a reverse direction before the coupling 23 strikes the collar 62, thereby lessening the impact. For slow speed operation, the springs 65 may be omitted.

The operation of the apparatus, referring to Figs. 1 and 2, is as follows: In Figs. 1 and 3, the injection plunger 13 and the molding compound measuring and feeding slides 37 and 38 have just returned to their fully retracted positions, as shown, upon completion of an operating cycle. During this operating cycle, plasticized molding compound was injected into the mold 34 and a measured amount of dry molding compound 22 (Fig. 2) was entered in the measuring chamber 46 while the injection plunger 13 was advancing. In the retraction of the plunger 13 to the position shown in Fig. 1, the previously measured amount of compound 22 in the chamber 46 was entered into the injection chamber 12 directly in front of the injection plunger, as shown in Fig. 1.

In this position of the parts (Figs. 1 and 3) and upon motive fluid being directed under suitable pressure into the right end of the hydraulic cylinder 25, by suitable well-known control means (not shown), the piston rod 24 and the attached injection plunger 13 are advanced to the left (Fig. 1) and the dry molding compound 22 directly in front of the plunger is advanced along the injection chamber 12 and into contact with the previously advanced and plasticized compound in the heating head 26, where it also becomes plasticized. During an initial predetermined portion of the advance of the plunger 13 determined by the distance between the left hand face of the coupling 23 and the collar 55, no movement of the slides 37 and 38 occurs. Upon the advancing coupling 23 engaging the collar 54, to which the slides 37 and 38 are attached, the latter are advanced and since they advance from this point on in unison with the injection plunger 13, the distance they move will depend upon the distance the plunger moves which, in turn, is dependent upon the quantity of compound remaining in the injection chamber 12 after each cycle of operation of the molding apparatus. In this advance of the slides 37 and 38 to the position shown in Fig. 2, energy is stored in the springs 65, which, in addition to maintaining the coupling 23 and collar 54 together during their advance, is later effective, in a manner to be described hereinafter, to return, in cooperation with the retraction of the injection plunger, the slides to their retracted position (Fig. 1). Thus, since the distance the slides 37 and 38 advance may vary, the effective size of the opening 52 in the slide 37 with relation to the hopper outlet opening 18 will also vary; consequently, the amount of compound 22 permitted to drop from the hopper through the slide opening 52 into the measuring chamber 46 will depend upon the distance the plunger 13 has travelled in the molding of a part. Although this advance travel of the plunger 13 is fairly uniform for each cycle of operation, plastic compound 22 in an excess amount at times tends to accumulate in the injection cylinder or dry compound in the measuring chamber and it is for this reason that measured amounts of compound are entered into the chamber 46 during each advance of the plunger 13. Thus the amount of compound, at all times, in the injection chamber 12 and the measuring chamber 46 may be controlled in accordance with the particular type of element being molded and with an injection pressure suitable to the molding of the element. Also, the arrangement results in the compound being suitably plasticized before its injection into the mold 34, since the amount, at all times in the injection chamber 12, is held substantially uniform in quantity.

As shown in Fig. 2, the injection plunger 13 has completed its advance or injection movement and a measured charge of compound 22 has dropped from the hopper outlet opening 18, through the opening 52 in the upper slide 37, which has been moved thereunder, and into the measuring chamber 46, where it rests on the lower slide 38. Thereafter, motive fluid is directed into the left end of the hydraulic cylinder 25, whereupon the plunger 13 is retracted, as hereinbefore stated, at a higher and uniform rate of speed than its advance speed and during the initial portion of it retractive movement, due to the maximum energy stored in the springs 65, the collar 55 abutting the coupling 23, and to which are attached the slides 37 and 38, moves with the plunger. After this initial movement of the parts, the energy remaining in the springs 65 is not sufficient to move the collar 55 with the attached slides 37 and 38 at the uniform rate of speed of the coupling 23 and plunger 13, but at a decelerated rate of speed. This differential in rate of movement of the parts is such that before the opening 53 in the lower slide 38 is in communication with the inlet opening 21 in the injection cylinder 11, the plunger 13 has been retracted sufficiently to position the left end face thereof to the right of the slide opening 53. Thus, there is no possibility of the compound 22 in the measuring chamber 46 being deposited on the peripheral surface of the plunger 13, which, if permitted, would result in such surface being gummed up with the compound and thus require frequent cleansing thereof. In the continued uniform rate of retractive movement of the coupling 23 and plunger 13, the right face of the coupling 23 (Fig. 2) moves into engagement with the left face of the slower moving collar 62 of the slide assemblage and, thereafter, the plunger 13 and slides 37 and 38 travel in unison at a uniform rate of speed until the collar 62 abuts the face 66 of the cylinder 25, the parts now being positioned as shown in Figs. 1 and 3, the cycle of operation of the apparatus being completed. As the faster moving left end face of the plunger 13, as hereinbefore described, moves to the right of the opening 53 of the slower moving slide 38, the measured charge of compound in the chamber 46 drops vertically through the injection cylinder inlet opening 21 and into the chamber 12 in front of the plunger 13, as shown in Fig. 1.

It is to be understood that the offset relation of the slide openings 52 and 53 and the unitary movement of the slides relative to the movement of the plunger 13 are such that at no time is it possible for the compound 22 to drop from the hopper 18 into the measuring chamber 46 during the opening of the latter to the injection chamber 12 or before the measuring chamber is closed to the injection chamber, or at any time for the compound to drop onto the plunger, but only in front of it.

What is claimed is:

1. In an injection apparatus, a horizontal injection cylinder having an inlet, an injection plunger reciprocatable in said cylinder, a compound supply hopper having an outlet in spaced vertical alignment with said inlet, means including spaced vertical walls providing a passage between said outlet and inlet and in alignment with said inlet, a pair of spaced upper and lower slides reciprocatable as a unit on said means and spanning said passage, said upper slide having a feed opening therein normally out of vertical alignment with said inlet and said lower slide having an opening therein normally in alignment with said inlet, and a lost motion connection between said slides and said plunger for moving said slides as a unit alternately to place said openings in alignment with said inlet to feed amounts of compound from said hopper to said cylinder depending upon the amount of movement of said slides.

2. In an injection apparatus, a horizontal injection cylinder having an inlet, an injection plunger reciprocatable in said cylinder, a compound supply hopper having an outlet in spaced vertical alignment with said inlet, means including spaced vertical walls providing a passage between said outlet and inlet and in alignment with said inlet, a pair of spaced upper and lower slides reciprocatable as a unit on said means and spanning said passage, said upper slide having a feed opening therein normally positioned out of alignment with said inlet to block movement of material through said inlet, said lower slide having an opening therein normally in alignment with said inlet to discharge compound into said inlet, an adjustable member in said means and between said slides forming one wall of a chamber completed by said means and said slides for varying the normal capacity thereof, and means of connection between said slides and plunger moving said slides through varying amounts as controlled by the distance of travel of the plunger for feeding an amount of compound depending on the distance of travel of said plunger.

3. In an injection apparatus, a horizontal injection cylinder having an inlet, an injection plunger reciprocatable in said cylinder, a compound supply hopper having an outlet in spaced vertical alignment with said inlet, means including spaced vertical walls providing a passage between said outlet and inlet and in alignment with said inlet, a pair of spaced upper and lower slides having offset openings and reciprocatable as a unit on said means and spanning said passage, said slides and means forming a chamber for receiving charges of compound from said hopper, the size of said charges depending upon the position to which the upper slide is moved with respect to the outlet of the hopper, an adjustable member in said means and between said slides forming one wall of said chamber for varying the normal capacity thereof, and a lost motion connection between said slides and said plunger to positively move the slides an amount proportional to the amount of travel of the plunger and also operable for retracting the slides to normal position at a rate different from the rate of retraction of the plunger to the normal position for feeding predetermined amounts of compound from said hopper to said cylinder.

4. In an injection apparatus, a horizontal injection cylinder having an inlet, an injection plunger reciprocatable in said cylinder, a compound supply hopper having an outlet in spaced vertical alignment with said inlet, means including spaced vertical walls providing a passage between said outlet and inlet and in alignment with said inlet, a pair of spaced upper and lower slides having offset openings and reciprocatable as a unit on said means and spanning said passage, said slides and means forming a chamber for receiving metered charges of compound from said hopper, and an operative connection between said plunger and said slides for moving said slides during an advance of said plunger to variably uncover the opening in said upper slide to permit a metered charge of compound to be received in said chamber from said hopper while maintaining the bottom of said chamber closed by said lower slide, the volume of such charge depending on the degree of uncovering of said upper slide opening and controlled by the distance the plunger has advanced, the opening in said lower slide being positioned to open the chamber to the inlet of said cylinder during the retraction of said plunger after the upper slide has closed the hopper outlet.

5. In an injection apparatus, a horizontal injection cylinder having an inlet, an injection plunger reciprocatable in said cylinder, a compound supply hopper having an outlet in spaced vertical alignment with said inlet, means including spaced vertical walls providing a passage between said outlet and inlet and in alignment with said inlet, a pair of spaced upper and lower slides having offset openings and reciprocatable as a unit on said means and spanning said passage, said slides and means forming a chamber for receiving metered charges of compound from said hopper, an adjustable member in said means and between said slides forming one wall of said chamber for varying the normal capacity thereof, and an operative connection between said plunger and said slides for moving said slides during an advance of said plunger to variably uncover the opening in said upper slide to permit a metered charge of compound to be received in said chamber from said hopper while maintaining the bottom of said chamber closed by said lower slide, the volume of such charge depending on the degree of uncovering of said upper slide opening and controlled by the distance the plunger has advanced, the opening in said lower slide being positioned to open the chamber to the inlet of said cylinder during the retraction of said plunger after the upper slide has closed the hopper outlet.

6. In an injection apparatus, a horizontal injection cylinder having an inlet, an injection plunger reciprocatable therein, a compound supply hopper having the outlet in spaced vertical alignment with an inlet of said cylinder, means including spaced vertical walls providing a passage between said outlet and inlet, a pair of spaced upper and lower slides having offset openings and reciprocatable as a unit on said means and spanning said passage, said slides and spaced vertical walls forming a chamber for receiving metered charges of compound from said hopper, and an operative connection between said plunger and said slides for moving said slides during an advance of said plunger to variably uncover the opening in said upper slide to permit a metered charge of compound to be received in said chamber from said hopper while maintaining the bottom of said chamber closed by said lower slide, the volume of such charge depending on the degree of uncovering of said upper slide opening and controlled by the distance the plunger has advanced, the opening in said lower slide being positioned to open the chamber to the inlet of said cylinder during the retraction of said plunger after the upper slide has closed the hopper outlet.

7. In an injection apparatus, a horizontal injection cylinder having an inlet, an injection plunger reciprocatable therein, a compound supply hopper having the outlet in spaced vertical alignment with an inlet of said cylinder, means including spaced vertical walls providing a passage between said outlet and inlet, a pair of spaced upper and lower slides having offset openings and reciprocatable as a unit on said means and spanning said passage, said slides and spaced vertical walls forming a chamber for receiving metered charges of compound from said hopper, an adjustable member in said means and between said slides forming one wall of said chamber for varying the normal capacity thereof, and an operative connection between said plunger and said slides for moving said slides during an advance of said plunger to variably uncover the opening in said upper slide to permit a metered charge of compound to be received in said chamber from said hopper while maintaining the bottom of said chamber closed by said lower slide, the volume of such charge depending on the degree of uncovering of said upper slide opening and controlled by the distance the plunger has advanced, the opening in said lower slide being positioned to open the chamber to the inlet of said cylinder during the retraction of said plunger after the upper slide has closed the hopper outlet.

HARRY J. ARTHUR.
HARRELL S. McCRORY.

REFERENCES CITED

The following references are of record in the file of this patent:

UNITED STATES PATENTS

| Number | Name | Date |
| --- | --- | --- |
| 2,080,783 | Petersen | May 18, 1937 |
| 2,133,027 | Honig | Oct. 11, 1938 |
| 2,150,097 | Gunderson | Mar. 7, 1939 |
| 2,262,615 | Lester | Nov. 11, 1941 |
| 2,290,129 | Moreland et al. | July 14, 1942 |
| 2,351,454 | Pereles | June 13, 1944 |
| 2,353,276 | Stewart | July 11, 1944 |
| 2,358,956 | Ashbaugh | Sept. 26, 1944 |
| 2,361,432 | Stacy | Oct. 31, 1944 |